(12) United States Patent
Azgin et al.

(10) Patent No.: US 10,277,481 B2
(45) Date of Patent: Apr. 30, 2019

(54) STATELESS FORWARDING IN INFORMATION CENTRIC NETWORKS WITH BLOOM FILTERS

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 341 days.

(21) Appl. No.: 14/862,618

(22) Filed: Sep. 23, 2015

(65) Prior Publication Data
US 2017/0085441 A1   Mar. 23, 2017

(51) Int. Cl.
*H04L 12/26* (2006.01)
*H04L 12/24* (2006.01)
*H04L 29/06* (2006.01)
*H04L 12/801* (2013.01)

(52) U.S. Cl.
CPC ........ *H04L 43/028* (2013.01); *H04L 41/0803* (2013.01); *H04L 47/17* (2013.01); *H04L 69/22* (2013.01)

(58) Field of Classification Search
CPC .... H04L 43/028; H04L 41/0803; H04L 47/17
See application file for complete search history.

(56) References Cited

U.S. PATENT DOCUMENTS

| | | | |
|---|---|---|---|
| 2012/0082163 A1* | 4/2012 | Esteve Rothenberg | ..................... H04L 45/00 370/392 |
| 2012/0287934 A1* | 11/2012 | Sarela | ..................... H04L 45/04 370/392 |
| 2012/0300781 A1* | 11/2012 | Sarela | ..................... H04L 45/10 370/392 |
| 2014/0244779 A1* | 8/2014 | Roitshtein | ............. H04L 61/103 709/213 |
| 2017/0034285 A1* | 2/2017 | Bhandari | ................ H04L 67/16 |

* cited by examiner

*Primary Examiner* — Alex Skripnikov
*Assistant Examiner* — Pamit Kaur
(74) *Attorney, Agent, or Firm* — Conley Rose, P.C.

(57) ABSTRACT

A method implemented in a network element (NE) configured to operate in an information centric network (ICN), comprising receiving an Interest packet through an interface, wherein the Interest packet comprises an in-packet bloom filter and at least one counting filter associated with an element of the in-packet bloom filter; determining an outbound interface to forward the Interest packet to a next hop in the ICN; selecting a local bloom filter based on a mapping of the interface to the local bloom filter; updating a value for the in-packet bloom filter based on a product determined by a bitwise OR operation of the local bloom filter and the in-packet bloom filter; incrementing the at least one counting filter based on a change to the associated element of the in-packet bloom filter; updating the in-packet bloom filter in the Interest packet; updating the at least one counting filter in the Interest packet; and forwarding the Interest packet through the outbound interface.

20 Claims, 8 Drawing Sheets

STATELESS FORWARDING IN INFORMATION CENTRIC NETWORKS WITH BLOOM FILTERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g., forwarding plane) is decoupled from control decisions (e.g., control plane), such as routing, resources and other management functionalities in a centrally-controlled network. The decoupling also allows the forwarding plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

In one embodiment, the disclosure includes a network element (NE) configured to operate in an information centric network (ICN), the NE comprising a receiver configured to receive an Interest packet through a first interface, wherein the Interest packet comprises an in-packet bloom filter; a processor coupled to the receiver, wherein the processor is configured to determine a second interface to forward the Interest packet to a next hop in the ICN; select a local bloom filter from a plurality of local bloom filters based on a mapping of the first interface to the selected local bloom filter; update the in-packet bloom filter with a product of the selected local bloom filter and the in-packet bloom filter; and store the in-packet bloom filter in the Interest packet; and a transmitter coupled to the processor configured to forward the Interest packet through the second interface.

In another embodiment, the disclosure includes a method implemented in an NE configured to operate in an ICN, comprising receiving an Interest packet through an interface, wherein the Interest packet comprises an in-packet bloom filter and at least one counting filter associated with an element of the in-packet bloom filter; determining an outbound interface to forward the Interest packet to a next hop in the ICN; selecting a local bloom filter based on a mapping of the interface to the local bloom filter; updating a value for the in-packet bloom filter based on a product determined by a bitwise OR operation of the local bloom filter and the in-packet bloom filter; incrementing the at least one counting filter based on a change to the associated element of the in-packet bloom filter; updating the in-packet bloom filter in the Interest packet; updating the at least one counting filter in the Interest packet; and forwarding the Interest packet through the outbound interface.

In yet another embodiment, the disclosure includes a method implemented in an NE configured to operate in an ICN, comprising receiving a Data packet comprising an in-packet bloom filter and at least one counter associated with an element of the in-packet bloom filter; determining an interface from a plurality of interfaces based on a mapping of the in-packet bloom filter to the determined interface; decrementing the at least one counter based on a corresponding element of the in-packet bloom filter being necessary to determine the interface; removing data contained in the corresponding element of the in-packet bloom filter when the at least one counter indicates that the corresponding element of the in-packet bloom filter has been exhausted; updating the Data packet with the in-packet bloom filter and the at least one counter; and forwarding the Data packet through the interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
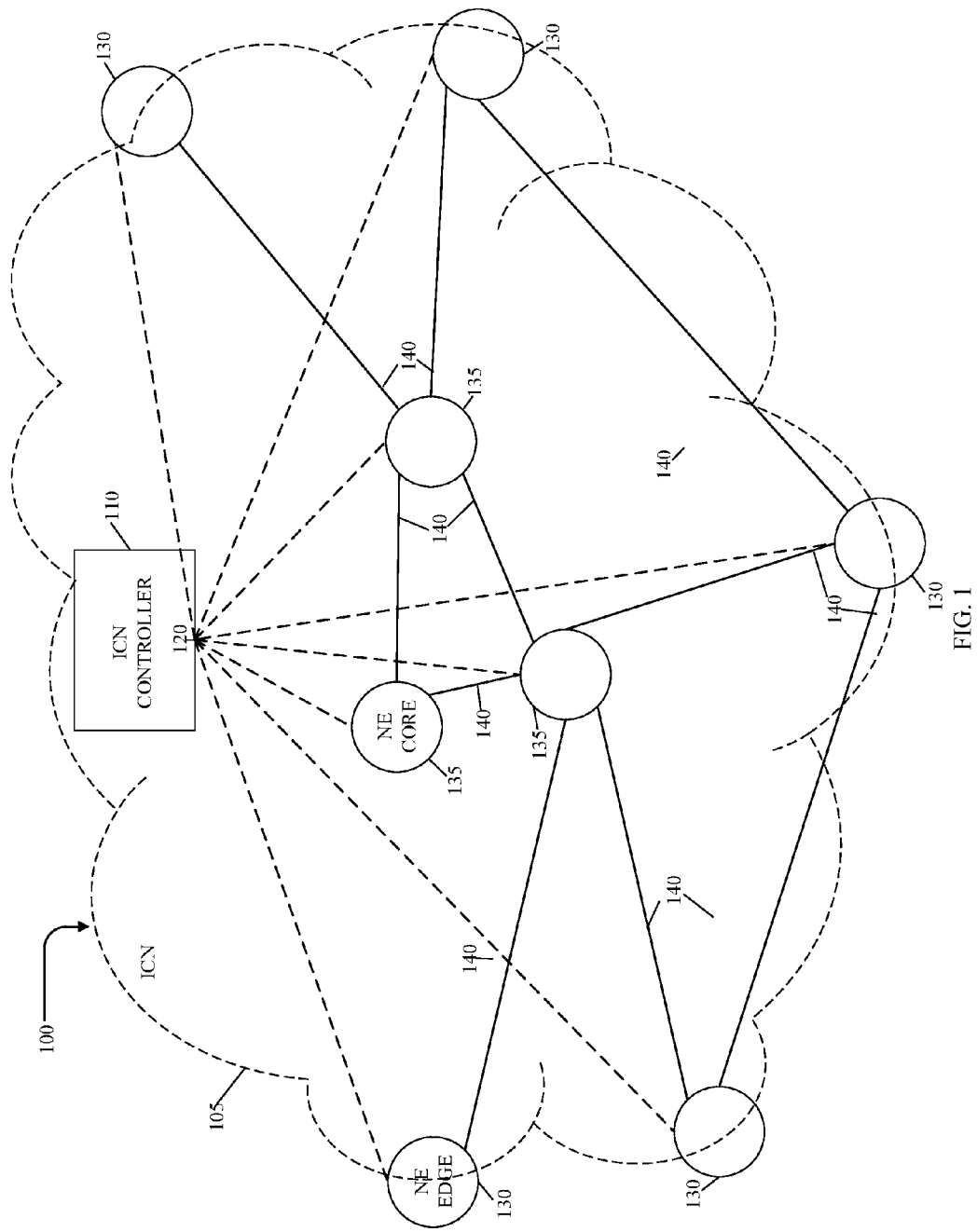
FIG. 1 is a schematic diagram of an embodiment of an architecture of an ICN.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An information centric network (ICN) is a type of network architecture that focuses on information delivery. ICNs may also be known as content-aware, content-centric, or data specific networks. ICNs shift the Internet Protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content servers.

In one embodiment, an ICN approach offers abstractions to perform a finer grained resource allocation than an IP approach. The abstractions are leveraged to perform content-based traffic engineering (TE), which may include assigning resources to each piece of content. A network neutrality principle may be implemented and any one piece or type of content is not prioritized over others. While the description is primarily directed to approaches with a resource allocation scheme that is blind to the type and producer of content, it is appreciated that presented approaches can be readily adapted to adjust performance based upon a variety of considerations (e.g., a provider may want to give better performance to content from a particular type of content, producer of content, etc.). In one embodiment, a content allocation architecture in an ICN provides functions for content-based resource allocation. Scheduling policies can take advantage of these functions to achieve a significant gain over IP resource allocation procedures. Network elements (NEs) within the ICN may be configured to implement the forwarding or data plane functions, while the control plane functions may be provided by an NE configured as an ICN controller. In such a network the data-forwarding capability (e.g., the data or forwarding plane) may be decoupled from the routing, resource, and other management functionality (e.g., the control plane).

Disclosed herein are various mechanisms for stateless forwarding of packets in an ICN through the employment of bloom filters within packet headers. As discussed below, incoming Interest packets are received on an interface of an NE. The interface is mapped to a local bloom filter that is applied to an in-packet bloom filter read from an Interest packet header, when the incoming interface is used to determine the local filter. The in-packet bloom filter may contain the reverse routing information of the path through the ICN traveled by the Interest packet. The in-packet bloom filter is updated with the product of the local bloom filter and the in-packet bloom filter. Additionally, any counters contained in the Interest packet headers and associated with the in-packet bloom filter are updated based on the resulting product. In various embodiments, the counters are counting filters. The Interest packet is then forwarded toward the producer of the requested content though the appropriate interface on the NE, which may be determined through an entry in a forwarding information base (FIB) contained on the NE. Once the producer of the requested content item (or an intermediary NE that contains the content item) receives the Interest packet, a Data/Content packet (hereinafter Data packet) is created and the in-packet bloom filter along with any counters are copied to headers in the Data packet. The Data packet is then forwarded back through the ICN toward the content requester. At each hop (subsequent NE), the in-packet bloom filter is read to determine the appropriate interface to forward the Data packet on toward the content requestor. The appropriate interface thus corresponds to the interface that the corresponding Interest packet was received through. The in-packet counters are decremented based on the bits read from the in-packet bloom filter to determine the appropriate interface. The in-packet bloom filter may then be updated based on the results of the decrementing of the counting filters. The in-packet bloom filter and/or counters are updated in the Data packet header accordingly. The Data packet is forwarded to the next determined hop in the ICN through the appropriate interface. The disclosed mechanisms remove the need to record entries in a Pending Interest Table (PIT) on NEs within the ICN for received Interest packets.

FIG. 1 is a schematic diagram of an embodiment of an architecture 100 of an ICN 105. The ICN 105 comprises an NE acting as an ICN controller 110 and a plurality of NEs acting as core content nodes 135, a plurality of edge content nodes 130, and/or other NEs, such as content producers and/or content consumers. As used herein, both edge content nodes 130 and core content nodes 135 may be referred to as content nodes. The edge content nodes 130 may be connected to at least one node outside of the ICN 105. The core content nodes 135 may not be connected to any node outside of the ICN 105. The content nodes 130 and/or 135 are interconnected by a plurality of links 140 and connected to the ICN controller 110 through network control interfaces 120.

The ICN 105 provides in-network caching, built-in content security, and multi-cast data distributions according to the ICN protocol. The ICN 105 may comprise one or more networking domains that are operated by one or more administrative domains. The links 140 may comprise physical links, such as fiber optic links, electrical links, wireless links, and/or logical links used to transport data in the ICN 105.

The ICN controller 110 may be a device, a virtual machine (VM), a hypervisor, or any other device operating in the control plane and configured to manage and/or control the routing and other management functions for NEs 130 within the ICN 105. The ICN controller 110 may be any type of network controller, such as a centralized controller or a distributed controller. In an embodiment, the ICN controller 110 is a software-defined networking (SDN) controller, such as an OpenFlow-enabled controller. In such an embodiment, the forwarding plane is decoupled from the control plane, and the ICN controller 110 configures each of the content nodes 130 and/or 135 with forwarding rules in the form of, for example, routing tables and/or flow tables. At least a portion of the forwarding plane may be included in the ICN, wherein the ICN includes multiple paths between a source and a destination. Some ICN architectures such as Content Centric Networking (CCN)/Named Data Networking (NDN) do not specify a controller, and assume a distributed routing mechanism. However, CCN/NDN includes a strategy layer that selects forwarding mechanisms for the network. For example, if an upstream edge content node has some knowledge of the downstream network congestion, the upstream edge content node may select the proper path for the data messages by assuming the function of the (now distributed) controller. For simplicity, the description is presented with respect to a centralized ICN controller. The presented approaches can be readily implemented with other controllers.

The content nodes 130 and/or 135 may be any physical devices, such as routers and/or network switches, or logical devices configured to perform switching functions in the ICN 105 as directed by the ICN controller 110. The switching functions include forwarding incoming Interest packets based on entries in an FIB applying the forwarding rules to the incoming packets, measuring statistics, and monitoring context changes.

The ICN controller 110 may be physically or logically located within the ICN 105. In an embodiment, the ICN controller 110 may be a centralized logical entity distributed across one or more NEs. In another embodiment, the ICN controller 110 may be implemented as a network control module within a VM. It should be noted the ICN controller 110 may be coupled to any of the content nodes 130 and/or 135 in the ICN 105.

The ICN controller 110 performs a variety of network control functions according to the application-specific objectives. Some examples of network control functions may include, but are not limited to, generating and maintaining network topologies, identifying application flows, determining routes through the ICN 105, and managing network resources and network state information. The ICN controller 110 may not perform data plane functions, such as forwarding data traffic to a selected destination. Moreover, the ICN controller 110 may be able to produce forwarding rules that define how incoming packets are routed within the ICN 105. In one embodiment, the ICN controller 110 may be integrated within a network operating system.

As part of the control plane functionality, the ICN controller 110 may be configured to collect fine-grained network information from content nodes 130 and/or 135 through the network control interface 120. Fine-grained network information may pertain to any of the information within the ICN 105, which may include, but are not limited to, the ICN domain topology, link capacity within the ICN 105, available bandwidth on each link with the ICN 105, and status of links that belong to the ICN 105 but are connected to the content nodes 130 and/or 135 and/or network nodes external to the ICN 105. Additionally, the fine-grained network information may be application-specific statistics, such as content popularity, or provider-specific, such as content provider popularity. Content popularity refers to the number of requests for a particular content item received from content consumers. Content provider popularity refers to the number of content consumers that download content via a particular content provider.

To deliver content through the forwarding plane of ICN 105, the ICN controller 110 may generate and optimize forwarding rules and may identify controls based on any application, content, or domain specific objectives, such as median completion times for traffic flows or the amount of network congestion. Some examples of controls may include security verifications and enforcements, context adaptations, content caching, policy enforcements, etc. After identifying and optimizing the forwarding rules, the ICN controller 110 may generate one or more flow entries based on the optimized forwarding rules and add the flow entry to each of the content nodes 130 and/or 135 along a forwarding path, for example, by sending the flow entry/entries in a flow configuration message via a network control interface 120. The network control interfaces 120 supports communication between the ICN controller 110 and the content nodes 130 and/or 135 and may employ a communication protocol and/or extend a communication protocol, such as the OpenFlow protocol.

The content nodes 130 and/or 135 receive routing decisions based on forwarding rules from the ICN controller 110. For example, the content nodes 130 and/or 135 create/update entries in the FIB based on the received routing decisions. The FIB entries store content name prefixes and corresponding downstream (e.g., outbound) interfaces coupled to a next hop within the ICN 105 toward a corresponding content producer.

The ICN may receive a request for content and the content flows back through the ICN once a source (e.g., content producer, repository or cache) is reached. In one exemplary implementation, there is a somewhat restrictive assumption that a content item is mapped to a single flow and that all chunks composing one content item are allocated to the same path through the network. It is appreciated that ICNs support delivery of the chunks from multiple sources. However, in one embodiment, a simplified approach is implemented where all chunks follow the same path.

To obtain a particular content item, a content consumer (e.g., content requester) creates an Interest packet comprising a header and sends the Interest packet through the ICN 105. The Interest packet is routed through the ICN 105 by the content nodes 130 and/or 135 toward the source of the requested content item based on the content name contained within the Interest packet header. When the Interest packet reaches a node within the ICN 105 that holds the requested content, a Data packet(s) comprising the content item is constructed. In an embodiment, an in-packet bloom filter contained in a header of the Interest packet is copied to a header in the corresponding Data packet(s). The Data packet is returned to the content consumer through the ICN 105 along the path traveled by the corresponding Interest packet by employing the copied in-packet bloom filters. The content nodes 130 and/or 135 measure and track fine-grained network information as packets arrive at the content nodes 130 and/or 135. The content nodes 130 and/or 135 provide the fine-grained network information to the ICN controller 110 through the network control interface 120.

For ease of explanation, in one example, a content flow enters the ICN 105, either from a host directly attached to the ICN at an edge content node 130 or from a different domain, and the ICN makes a content-based routing decision to deliver the content to the requester. In one embodiment, it is appreciated the term "flow" by itself may be used interchangeably with content. In one exemplary implementation, the flow or content is defined as the sequence of all chunks or portions of data belonging to a single data object. It is also appreciated that while flow is similar to content, there is a significant difference between IP flow control and content flow control. IP flow control may be difficult to implement because of the issues in obtaining an accurate descriptor of the amount of resources to allocate (e.g., difficult to predict the flow length just by reviewing the network layer information in the packet header, etc.).

In various embodiments, each inbound interface (or inbound-outbound interface pair) on a core content node 135 is mapped to a local bloom filter. Interest packets are received by the core content node 135 through one of the inbound interfaces. A local bloom filter mapped to the inbound interface is applied to an in-packet bloom filter that is contained in a header of the received Interest packet. The in-packet bloom filter may contain the reverse path information of the path through the ICN 105 traveled by the Interest packet before being received by the core content node 135. The core content node 135 applies the selected local bloom filter to the in-packet bloom filter. The product is then stored in the Interest packet as an updated in-packet bloom filter. Additionally, the core content node 135 increments any counters contained in the Interest packet headers associated with the updated bits or elements of the in-packet bloom filter. The Interest packet is then forwarded toward the producer of the requested content though the appropriate interface on the core content node 135 determined through a FIB contained on the core content node 135. In other embodiments, both the core content nodes 135 and the edge nodes 130 may be configured to employ the in-packet bloom filter and corresponding counters in a similar fashion to received or created Interest packets.

In various embodiments, when a producer of the requested content item (or an intermediary NE that contains the content item) receives the Interest packet, a Data packet is created comprising the requested content item. Additionally, the in-packet bloom filter and any counters from the corresponding Interest packet are copied and included as headers in the Data packet. The Data packet is then forwarded back through the ICN 105 toward the content consumer. When a core content node 135 receives the Data packet, the in-packet bloom filter is read to determine the appropriate interface to forward the Data packet on toward the consumer. The appropriate interface corresponds to the interface that the corresponding Interest packet was received through by the core content node 135 as the Interest packet was forwarded through the ICN 105 toward the content producer. The core content node 135 decrements the counters based on the bits or elements read from the in-packet bloom filter in order to determine the appropriate interface to forward the Data packet. The in-packet bloom filter may then be updated based on the results of the decremented counting filters. For example, a decremented counter may indicate that the data contained in a corresponding bit or element in the in-packet bloom may be removed (e.g., when the counter value becomes 0, the matching element from the bloom filter is removed). The updated values for the in-packet bloom filter and any counting filters stored in the Data packet header are updated accordingly. The Data packet is forwarded to the next determined hop in the ICN 105 through the determined appropriate interface of the core content node 135.

The in-packet bloom filter may be employed by NEs 130 and/or 135 in the ICN 105 to record the path through the ICN 105 of an Interest packet as the Interest packet is forwarded from the consumer to the producer and to determine the reverse path through the ICN for a subsequent Data packet.

In a stateful implementation, a PIT contained in the memory of an NE, such as NE 130 and/or 135, comprises entries that store, for a defined period of time, the interfaces on which Interest packets were received. The PIT entry is read by the NE to determine which interface should forward a corresponding Data packet when the Data packet is received by the NE.

Employment of an in-packet bloom filter by NEs, such as NEs 130 and/or 135, in an ICN, such as ICN 105, enables stateless forwarding and removes the need to record entries in a PIT on the NEs. The elimination of a PIT from NEs in an ICN reduces the amount of memory employed by the NE, reduces network latency issues that may be caused because of a large PIT size, and improves overall packet forwarding performance in the ICN because the local memory requirements of an NE necessary to support reverse path forwarding may no longer depend on traffic characteristics.

The employment of an in-packet bloom filter may support both software and hardware based designs and may provide robust forwarding through supporting dynamic mappings, which depend on local parameters and transport parameters. In an embodiment, local parameters may be, for example, system time and incoming/outgoing interfaces. In an embodiment, transport parameters may be, for example, a content hash. In an embodiment, requests for a same content item received at different times by an NE, such as NEs 130 and/or 135, in an ICN, such as ICN 105 trigger a different in-packet bloom filter, which prevent path estimates. In another embodiment, a non-deterministic assignment as to which bloom filter to use as a counter increment may reduce in-packet overheard. In an embodiment, the core nodes of an ICN employ in-packet bloom filters. In an embodiment, both the core nodes and the edge nodes of an ICN employ in-packet bloom filters.

In an embodiment, edge content node 130 in the ICN 105 receives an Interest packet from a content requestor either directly or indirectly. Edge content node 130 may create the in-packet bloom filter through the employment of bloom filters when an Interest packet is received. Edge content node 130 adds the in-packet bloom filter and any associated counters as headers to the received Interest packet and forwards the Interest packet through a determined interface toward the producer of the requested content item. Each core content node, such as core nodes 135, along the path toward the producer adds information regarding the interfaces on which the Interest packet was received and/or forwarded to the in-packet bloom filter. When the Interest packet reaches the producer, or an NE that contains the requested content, a Data packet comprising the requested content item is created. The in-packet bloom filter and any associated counters contained in the corresponding Interest packet headers are copied as headers to the Data packet. The Data packet is then returned through ICN 105 toward the content requester. At each hop along the return path through the ICN, each NE, such as NEs 130 and/or 135, reads the in-packet bloom filter and determines (i) whether an Interest was received for the given Data, and (ii) when an Interest was received, the interface(s) on which the corresponding Interest packet(s) was received. The NE then decrements any counters associated with the read bits or elements of the in-packet bloom filter. The NE may update the in-packet bloom filter depending on the results of the decremented counters (e.g., the counters indicate that a bit or element has been exhausted). The NE then forwards the Data packet toward the requester through the determined interface. Thus, the disclosed embodiment supports entry removal at each hop along the reverse path toward the consumer, thereby preserving the perceived false positive rate at each NE.

Figure 2:
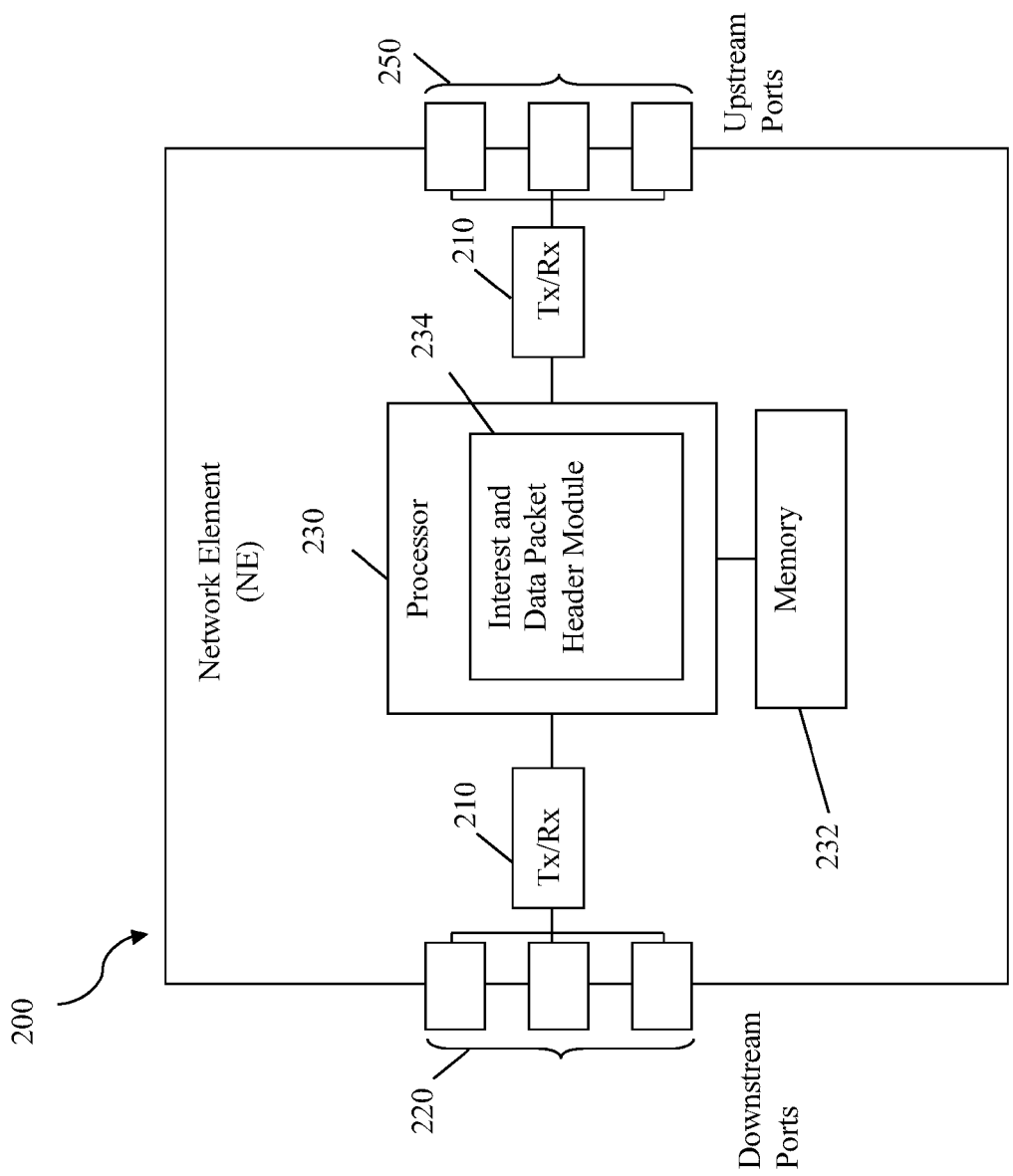
FIG. 2 is a schematic diagram of an NE in an ICN.

FIG. 2 is a schematic diagram of an embodiment of an NE 200 in an ICN, such as ICN 105. NE 200 may be any component configured to act as an ICN controller, such as ICN controller 110 and/or content nodes, such as NEs 130 and/or 135. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network, e.g., a switch, router, bridge, server, a client, etc.

As shown in FIG. 2, the NE 200 may comprise transceivers (Tx/Rx) 210, which are transmitters, receivers, or combinations thereof. A Tx/Rx 210 is coupled to a plurality of downstream ports 220 (e.g., downstream interfaces) for transmitting and/or receiving packets from other nodes and a Tx/Rx 210 coupled to a plurality of upstream ports 250 (e.g., upstream interfaces) for transmitting and/or receiving packets from other nodes, respectively. A processor 230 is coupled to the Tx/Rxs 210 to process the packets and/or determine which nodes to send packets to. The processor 230 may comprise one or more multi-core processors and/or memory 232 devices, which function as data stores, buffers, Random Access Memory (RAM), Read Only Memory (ROM), etc. Processor 230 may be implemented as a general processor or may be part of one or more application specific integrated circuits (ASICs) and/or digital signal processors (DSPs). Processor 230 comprises an Interest and Data Packet Header Module 234, which implements at least some of the methods discussed herein such as methods 400, 500, 600 and/or 700 described below. In an alternative embodiment, Interest and Data Packet Header Module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the Interest and Data Packet Header Module 234 is implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, Interest and Data Packet Header Module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
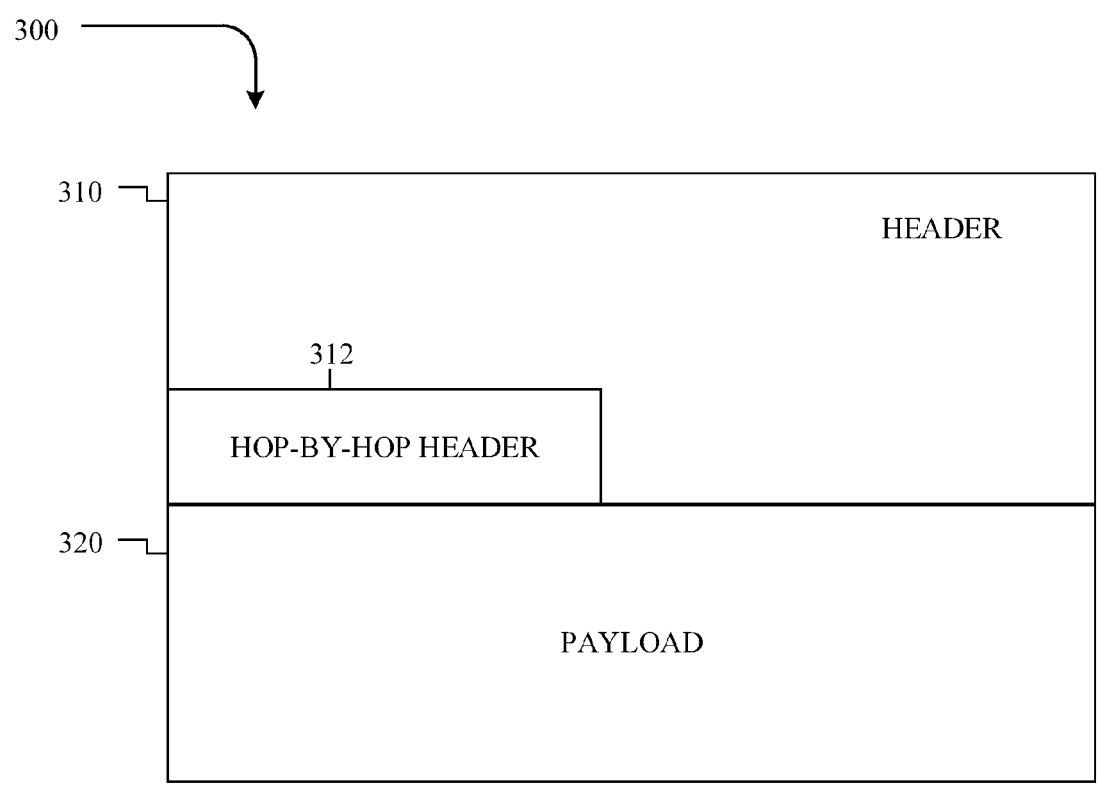
FIG. 3 is a schematic diagram of a packet distributed in an ICN.

FIG. 3 is a schematic diagram of an embodiment of a packet 300 distributed in an ICN, such as ICN 105. Packet 300 may be received by and forwarded from NEs, such as edge content nodes 130 and core content nodes 135, within the ICN. Packet 300 may employ a Type-Length-Value (TLV) format to encode messages into a "TLV Packet". The packet 300 may comprise a header part 310 and a payload part 320. The header part 310 may comprise a hop-by-hop header 312.

In various embodiments, packet 300 may be an Interest packet or Data packet as described above. In an embodiment, an Interest packet may comprise a header part 310 and a payload part 320. In an exemplary embodiment, the header part 310 within an Interest packet may comprise fixed headers and optional headers which may be in TLV format. In an exemplary embodiment, the hop-by-hop header 312 is an optional header. In an exemplary embodiment, the payload part 320 within an Interest packet may comprise a name, selectors, nonce, and guiders. In one embodiment, the name comprises a hierarchical sequence of name components and describe a particular content item(s) within the ICN; the selectors are optional elements that further qualify a content item(s) that may match the Interest; the nonce value is a randomly-generated byte stream that is used to detect looping Interests within the ICN; and the guiders indicate the time remaining before the Interest times out, which may be relative to the arrival time of the Interest at a current NE in the ICN. In an embodiment, the name and nonce combination uniquely identify the Interest packet. In an embodiment, a nonce value may be generated through a Counter Mode Cipher Block Chaining Message Authentication Code Protocol (CCMP) encryption algorithm according to an address contained in the header part 310. In an embodiment, the nonce value may be employed in an encryption calculation process. In an embodiment, the payload may contain nested TLV encoded content.

In an embodiment, packet 300 may be a Data packet in the ICN. A Data packet may comprise a header part 310 and a payload part 320. In an exemplary embodiment, the header part 310 within a Data packet may comprise fixed headers and optional headers, which may be in TLV format. In an exemplary embodiment, the hop-by-hop header 312 is an optional header. In an exemplary embodiment, the payload part 320 for a Data packet may comprise a name, meta-information, content, and a signature. In one embodiment, the name comprises a hierarchical sequence of name components and describe a particular content item(s) within the ICN; the meta information is an optional component that may comprise a content type, freshness period, and/or a final block identifier; the content comprises a content item(s) corresponding to the name (e.g., the requested content item); and the signature comprises data that may be employed to verify the authenticity of the content item contained within the Data packet. In an embodiment the content type identifies a type of content within the Data packet, the freshness period indicates a length of time before the Data packet becomes stale, and the final block identifier indicates an identifier of a final block in a sequence of fragments and may represent the last explicit Name Component of the final block.

In various embodiments when an NE, such as NE 130 or 135, in an ICN, such as ICN 105, receives a Data packet, the NE determines if the in-packet bloom filter contained in a hop-by-hop header 312 in the Data packet header part 310 matches an interface on the NE. If a match is found, the received Data packet is forwarded toward the content consumer through the matched interface. In an exemplary embodiment, the NE performs a bitwise AND operation to the in-packet bloom filter to determine a match to an interface. In various embodiments when multiple interfaces are matched, the received Data packet may be sent over the multiple matching interfaces.

In an embodiment, mapping tables or map-tables are employed to store the mappings of the local bloom filters to the inbound/outbound interfaces on the NE. The mapping tables may be implemented on the on-chip memory, which provides quick access to the map-table entries. In various embodiments for NEs with very large number of interfaces, additional combined mappings may be employed to limit the search space thus reducing mismatched interfaces during the initial search.

In an embodiment, each NE may update local bloom filters on a regular basis to increase security. In an embodiment, time-intervals between updates are selected by each NE independently.

Figure 4:
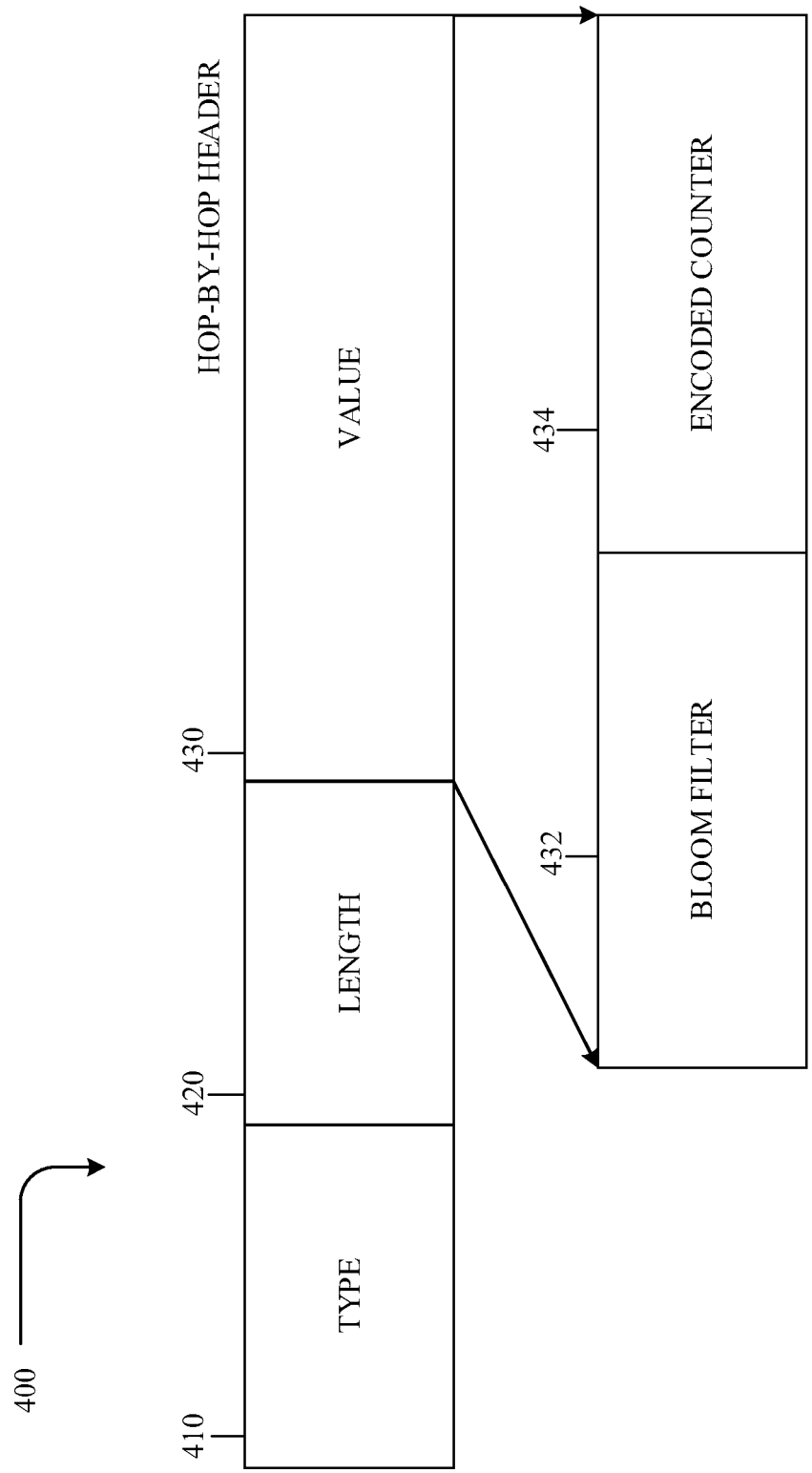
FIG. 4 is a flowchart of a method employed by an NE in an ICN to update an in-packet bloom filter and any counting filter(s) included as headers in an Interest packet received on the NE.

FIG. 4 is a schematic diagram of an embodiment of a hop-by-hop header 400, such as hop-by-hop header 312, which may be embedded in a header part, such as header part 310, of a packet, such as packet 300. Hop-by-hop header 400 may comprise subcomponents. In various embodiments these subcomponents are type field 410, length field 420, and value field 430. In an embodiment type field 410 comprises 2 Bytes and assigns the value PIT-Counting Bloom filter (CBF) for the in-packet filter, length field 420 comprises 2 Bytes long and represents the filter length, and value field 430 is of variable length and may contain the encoded CBF. The value field 430 may comprise two sub-fields: bloom filter 432 and encoded counter 434. In various embodiments, the contents of the two sub-fields, bloom filter 432 and encoded counter 434, make up the CBF. In an embodiment, sub-field bloom filter 432 contains a regular Bloom filter (e.g., the in-packet bloom filter). The in-packet bloom filter contained in sub-field bloom filter 432 may comprise routing information regarding a path through the ICN of a packet, such as packet 300.

Sub-field encoded counter 434 may contain any counters or counting filters associated with the in-packet bloom filter contained in sub-field bloom filter 432. In various embodiments, the counters contained in encoded counter 434 are mapped to a bit or elements in the in-packet bloom filter contained in bloom filter 432. In these embodiments, each element is incremented or decremented based on the mapped bit or element being updated or read respectively. Thus, the counters contained in encoded counter 434 may identify the number of inserted entries corresponding to a set bit location of the in-packet bloom filter.

In various embodiments, when NEs in an ICN, such as ICN 105, employ bloom filters to create an in-packet bloom filter (e.g., a reverse forwarding label), the in-packet bloom filter is stored in a hop-by-hop header, such as hop-by-hop header 400, within a value filed, such as value field 432. The bloom filters employed by the NEs in the ICN are probabilistic data structures designed to test membership of elements (e.g., interfaces on an NE) to a set. The bloom filters may allow for false positive matches but not false negative matches. To generate a bloom filter, all the bits in the bloom filter are first initialized to zeroes and the filters associated with incoming/outgoing interfaces on a given NE are added to the bloom filter to create a set. To add an interface to the bloom filter, the interface identifier is hashed k times (e.g., with k hash functions) to generate k bit positions in a bit vector of the bloom filter and the bits are set to ones. It should be noted that the bloom filters may be configured with different lengths and/or a different number of hash functions depending on, for example, the number of NEs in the ICN, the number of interfaces on each NE and/or an allowable probability of false positive matches. In an embodiment, the in-packet bloom filter comprises 32-bytes.

An NE, such as NE 130 and/or 135, within the ICN, such as ICN 105, employs k hash functions to determine the value for the in-packet bloom filter to be embedded in a received Interest and forwarded to the next hop. In one embodiment, the bits within an in-packet bloom filter are toggled based on the interface on which an Interest packet arrived in the NE. In one embodiment, each interface of an NE is mapped to a key value and a hash of the key value provides a modular to the number of bits in the in-packet bloom filter. The modular provides an index that is set in the in-packet bloom filter. In various embodiments, the value of k can be varied depending on network requirements (e.g., k may be chosen as 8 for a particular NE where 8 of the 256 bits within the in-packet bloom filter are set at the NE for each possible incoming/outgoing-interface combination). In various embodiments, a hash value is assigned to each combination locally on the NE and not shared with other NEs in the ICN. In various embodiments to increase overall security, NEs within the ICN may employ dynamically varying local bloom filters by introducing an aspect of randomness.

In one embodiment, local bloom filters are pre-calculated for each interface and stored by NE, such as NE 130 and/or 135, in an ICN, such as ICN 105, thus the NE does not have to calculate the k hash functions each time an Interest packet is received, which increases the overall optimization and performance of the NE. In this embodiment, the pre-calculated local bloom filter corresponding to the interface on which an Interest packet was received, and/or the interface over which the Interest packet is forwarded, is applied to the in-packet bloom filter read from sub-field bloom filter 432. In an exemplary embodiment, the application performed is a bitwise OR of the local bloom filter and the in-packet bloom filter read from the sub-field bloom filter 432. Sub-field bloom filter 432 together with sub-field encoded counter 434, if implemented, is then updated with the result so as to store the interface information within the value 430 subcomponent of the hop-by-hop header 400.

In various embodiments, counters (or counting filters) are included in sub-field encoded counter 434. The counters provide a mechanism to reduce false positives on outgoing interface determinations for received Data packets. The type of hash selected for the in-packet bloom filter, the in-packet bloom filter size and other local metrics regarding the bloom filter on an NE, such as NE 130 and/or 135, in an ICN, such as ICN 105, may also mitigate false positive determinations. In one embodiment, a counting filter may be enabled in a subset of NE. In an embodiment, a Content Hash within the value subcomponent 430 of the hop-by-hop header 400 allows an NE to identify whether counters are implemented.

In another embodiment, an NE, such as NE 130 and/or 135, in an ICN, such as ICN 105, employs a non-counting filter implementation. In this embodiment, the NE may transition a local bloom filter by: 1) creating a new local bloom filter; 2) adding, through the new local bloom filter, the corresponding interface information to the in-packet bloom filters contained in Interest packets received via the corresponding interface; 3) using a product of a bitwise OR of the prior local bloom filter and new local bloom filter to determine an outbound interface for incoming Data packets for a period of max round trip time in the ICN; and 4) using only the new local bloom filter for received Data packets after the time period has expired. In another embodiment, the NE may switch to a mode that no longer updates the counters within encoded counter 434 during a set time interval after a local bloom filter has been updated. After the time interval, the employment of counters may be reinstated by the NE. In another embodiment, the NE stores the result of the bitwise OR of the prior local bloom filter and the newly created local bloom filter (e.g., the NE does not recalculate for each packet received) in the value subcomponent 430 to improve memory performance by reducing memory requirements.

In an embodiment, variable length encoding is employed to assign different length values to different counts. The employment of a variable length encoding, such as TLV, limits the overhead (e.g., size) of the counting filter stored within the hop-by-hop header 300 and allows for dynamic size management. In one embodiment, the encoded counter 434 is included as an optional part of hop-by-hop header 300. In one embodiment, the TLV is defined for the header as Type: CBF (Counting Bloom Filter), Length: 32+VL (Variable length) Bytes (zero padding is employed, if necessary), Value: 32B constant sized Bloom Filter+VL Counter (or Counter Filter) field. In one embodiment, a non-counting filter implementation may be employed by setting counting filter length to the in-packet bloom filter length (e.g., 32). For various embodiments where the counting filters are not implemented, any newly set bit may be identified within the counter, hence, such bits may be included as 0.

In several embodiments, processing of an Interest packet by an NE, such as NE 130 and/or 135, in an ICN, such as ICN 105, involves local filter extraction and packet filter update. The input to the hash functions (used to determine local filters) is a combined interface metric (incoming-to-outgoing), which suggests ($\theta_i \times \theta_o$) possible output values at each NE within the ICN, where $\theta_{i,o}$ represent the number of {INCOMING;OUTGOING} interfaces. As no state is preserved at the NEs regarding the received requests, a combined metric is employed to forward Data packets along the correct interface. Furthermore, each NE performs the hash value assignment locally (i.e., no information is shared with other NEs), and stores the resulting output at a local filter table. In an embodiment, all outgoing interfaces can be assigned the same metric to allow the use of only the incoming interface information to determine the local filters. In another embodiment, if only the outgoing interface is employed to determine the value for the in-packet filter, additional state information may be used to identify the incoming interface.

After an Interest is received by an NE, and the outgoing interface is determined by the FIB lookup, a local filter is extracted from the a bloom filter database. In an embodiment, the bloom filter table is constructed as a ($\theta_i \times \theta_o$) entry table, where the kth entry corresponds to the incoming-outgoing interfaces of {[k/$\theta_i$], MOD(k−1, $\theta_i$)+1}, where k≥1. The received in-packet bloom filter contained within the value 430 subcomponent of the hop-by-hop header within the Interest packet header part, such as header part 310, is updated with the local filter using a bitwise OR operation on the in-packet bloom filter, and incremental processing on the counter contained within encoded counter 434 sub-field before the packet is forwarded to the next hop. In an embodiment, an NE employ a bit stream processor to incrementally process the counters in order to create the processed filter values with no change in filter order. In such an embodiment, the NE processes the filters (received in-packet bloom filter and determined local filter) and the counters simultaneously, and updates the counters using various approaches. In one approach, if both filters have set bits at the same location, the NE extracts the counter bits and increment the counter. In another approach, if received filter value is 1, and local filter value is 0, the NE extracts the counter bits and output the counter bits. In still another approach, if the received in-packet bloom filter value is 0, and local filter value is 1, the output for the counter is 0.

In an embodiment in order to update the filter order and the matching bit counters, the NE creates two output streams simultaneously, one of which assumes no change in filter order and the other assumes a change in filter order. In such an embodiment, the correct filter becomes the output depending on the resulting filter order. In another embodiment in order to update the filter order and the matching bit counters, the NE employs encoding matching the current filter order for all the filter entries and then performs a final update on the in-packet bloom filter based on the change observed in the filter order.

In several embodiments, processing of a Data packet by an NE, such as NE 130 and/or 135, in an ICN, such as ICN 105, involves matching a contained in-packet bloom filter (from the value subcomponent 320 of the hop-by-hop header 300) with the local filter corresponding to the incoming interface for the Data packet, to find the outgoing interface(s) over which to send the Data packet, if exists, after the Data packet is received. To find a matching interface, a BITWISE AND operation is employed by the NE.

In various embodiments, NE employ an interface mapping table (IMT) stored in on-chip memory to speed up the search process to find the matching interface. In an embodiment, the NE employs, sequential processing on the combined filters to eliminate candidate filters at each step (e.g., comparing the first bytes, ith bytes, jth bytes, etc.). A search may then be implemented by the NE using successive BITWISE AND operations (on the initially matched space) to find the outgoing interface(s). If multiple interfaces are matched, the Data packet is sent over multiple interfaces. After an outgoing interface is found, the NE decrements the counters.

Figure 5:
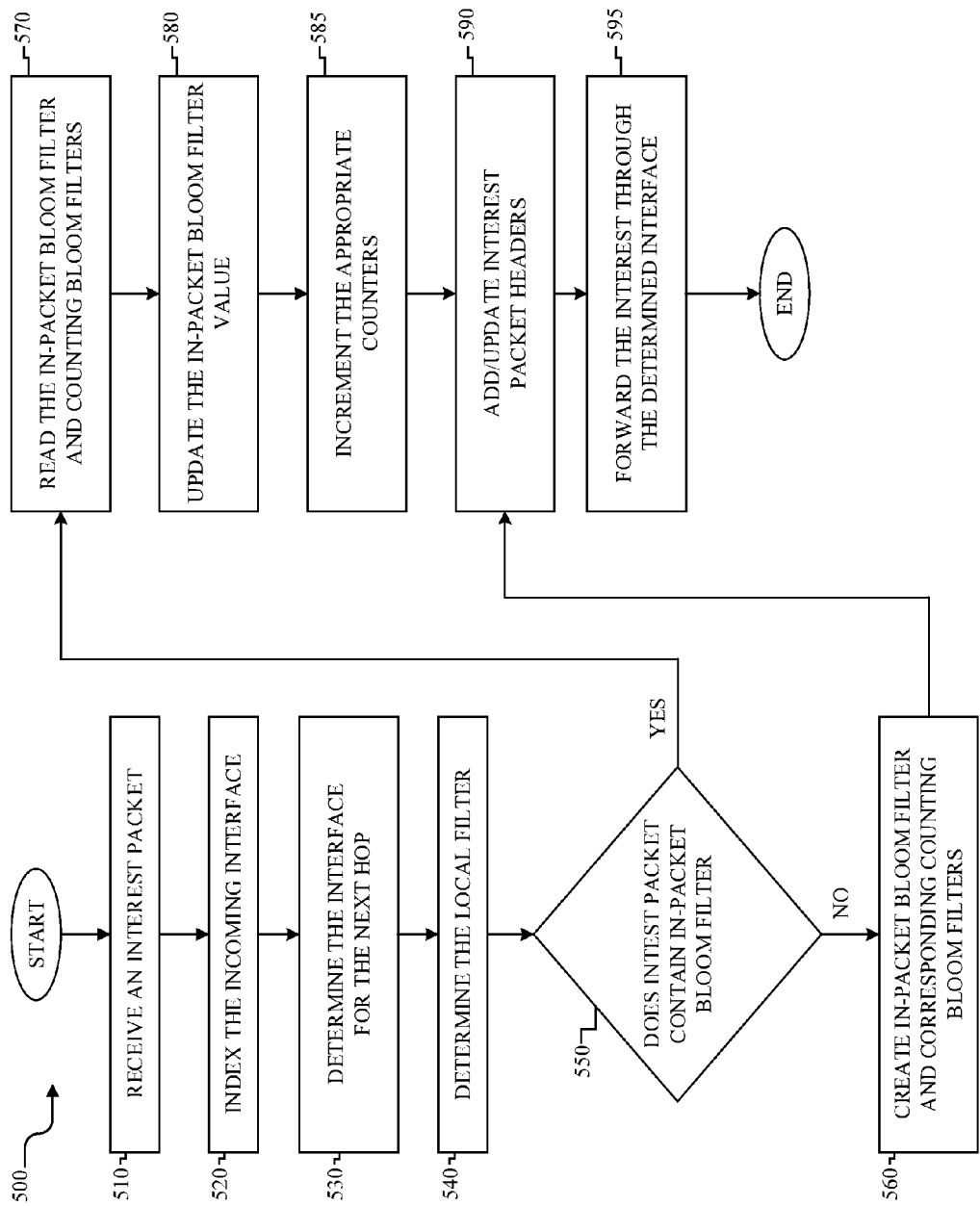
FIG. 5 is a flowchart of a method employed by an NE in an ICN to determine an appropriate interface, if any, to forward a received Data packet through the employment of an in-packet bloom filter and counting filter(s) included as headers in the Data packet.

FIG. 5 is a flowchart of an embodiment of a method 500 employed by an NE, such as content node 130 and/or 135, in an ICN, such as ICN 105, to update an in-packet bloom filter and any counters included as headers in an Interest packet, such as packet 300, received by the NE. Method 500 may be implemented when an NE in the ICN receives an Interest packet. At step 510, the NE receives an Interest packet. At step 520, the NE indexes the incoming interface of the Interest packet. At step 530, the NE determines the interface corresponding to a next hop within the ICN toward the content producer, if only the incoming interface is used to determine the local filter. At step 540, the NE determines a local bloom filter based on the indexed incoming interface. In an alternate embodiment, at step 540, the NE determines a local bloom filter based on the indexed incoming interface and the determined interface corresponding to the next hop. At decision step 550, the NE determines whether the Interest packet contains a hop-by-hop header, such as hop-by-hop header 310 and/or 400. If the Interest packet does not contain hop-by-hop header, the NE proceeds to step 560. At step 560, the NE creates an outbound in-packet bloom filter and counters based on the local bloom filter and a configuration of the NE and proceeds to step 590. If the Interest packet contains a hop-by-hop header, the NE proceeds to step 570. At step 570, the NE reads the in-packet bloom filter from the bloom filter sub-filed, such as sub-filed bloom filter 434, of the hop-by-hop header and any counters from the encoded counter sub-filed, such as sub-filed encoded counter 434, of the hop-by-hop header of the received Interest packet. At step 580, the NE updates the in-packet bloom filter value by performing a bitwise OR operation to the received in-packet bloom filter and the determined local bloom filter, the product of which is an outbound in-packet bloom filter. At step 585, the NE increments the counters corresponding to the altered bits or elements of the outbound in-packet bloom filter compared to the received in-packet bloom filter. At step 590, the NE adds/updates the sub-filed bloom filter of the hop-by-hop header contained in the Interest packet with the value of the outbound in-packet bloom filter and the NE also adds/updates the encoded counter sub-filed of the hop-by-hop header contained in the Interest packet with the values of the incremented counters. At step 595, the NE forwards the received Interest packet through the determined interface.

Figure 6:
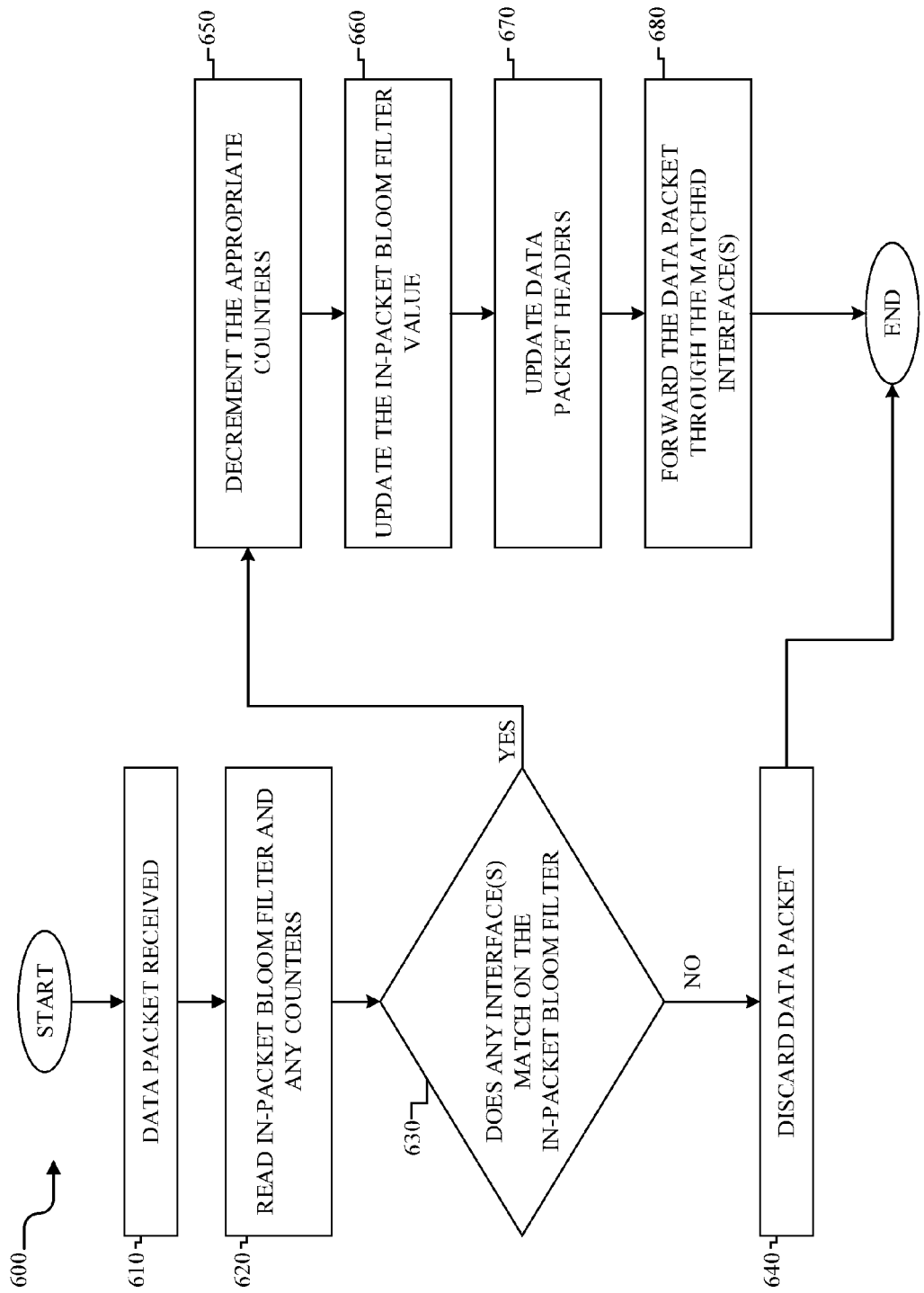
FIG. 6 a flowchart of an exemplary embodiment of a method of forwarding an Interest packet received by an NE in an ICN.

FIG. 6 is a flowchart of an embodiment of a method 600 employed by an NE, such as content node 130 and/or 135, in an ICN, such as ICN 105, to determine an appropriate interface, if any, to forward a received Data packet, such as packet 300, through the employment of an in-packet bloom filter and counting filter(s) included as headers in the Data packet. Method 600 may be implemented when an NE in the ICN receives a Data packet. At step 610, a Data packet is received. At step 620, an in-packet bloom filter is read from the bloom filter sub-field, such as sub-field 434, of a hop-by-hop header, such as hop-by-hop header 300 and/or 400, and any counters from the encoded counter sub-field, such as encoded counter 432, of the hop-by-hop header contained in the received Data packet. At decision step 630, a bitwise AND operation is performed with the received in-packet bloom filter and local bloom filters contained within a memory of the NE to determine whether the in-packet bloom filter matches any of the interfaces contained in the NE. If no match is found, the method 600 proceeds to step 640. At step 640, the Data packet is discarded because no interface was matched to the received in packet bloom filter. If one or more matches are found, the method 600 proceeds to step 650. At step 650, the counters corresponding to the bits or elements in the in-packet bloom filter read in the determination of the matched interface(s) are decremented. At step 660, values in the bit or elements in the in-packet bloom filter that the corresponding determined counter(s) indicate as being exhausted are set to zero (e.g., zeroed out). At step 670, the bloom filter sub-field of the hop-by-hop header contained in the Data packet is updated with the updated in-packet bloom filter and the encoded counter sub-filed of the hop-by-hop header contained in the Data packet is updated with the values of the decremented counters. At step 680, the received Data packet is forwarded through the matched interface(s).

Figure 7:
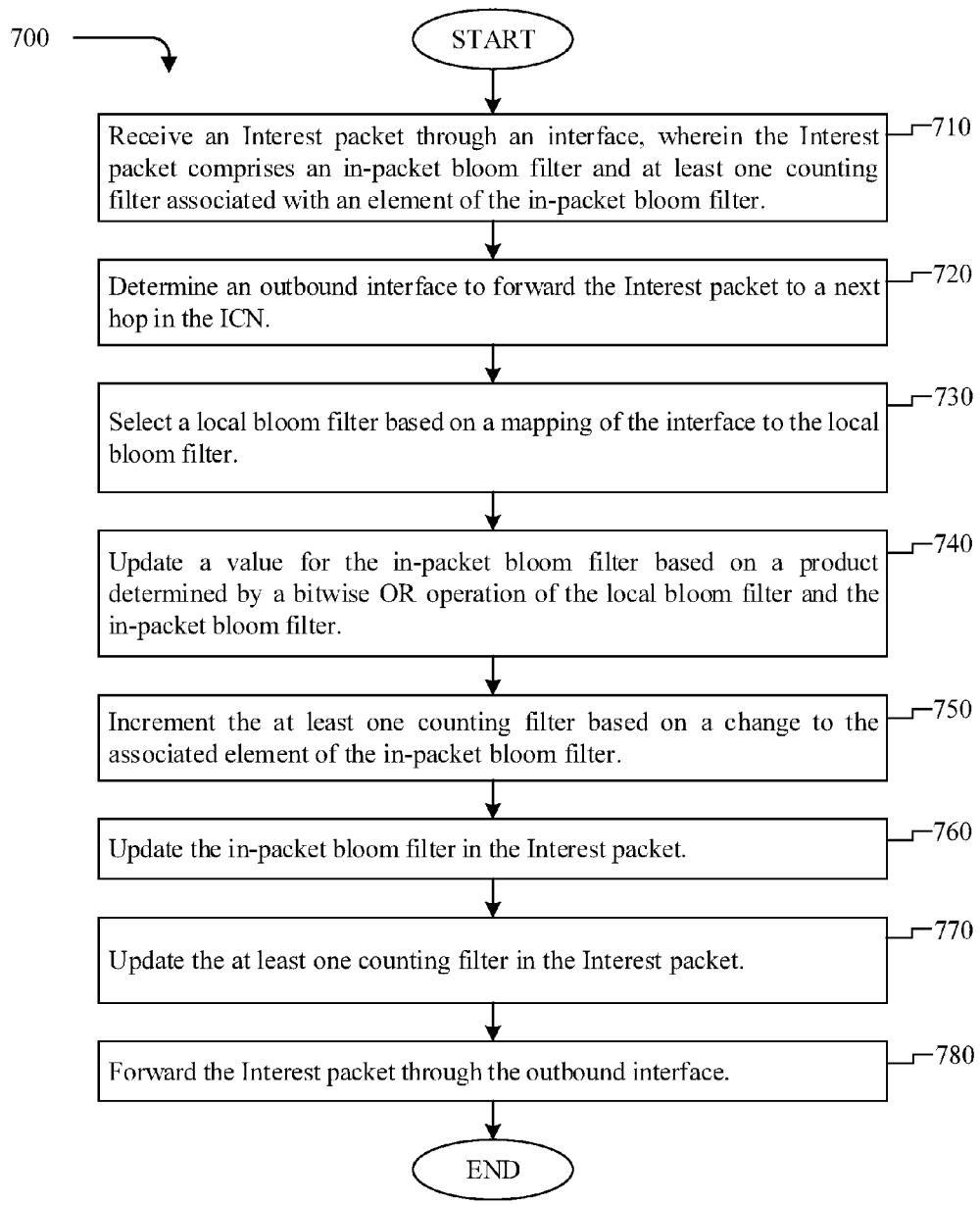
FIG. 7 a flowchart of an exemplary embodiment of a method of forwarding a Data packet received by an NE in an ICN.

FIG. 7 is a flowchart of an exemplary embodiment of a method 700 of forwarding an Interest packet, such as packet 300, received by an NE, such as content node 130 and/or 135, in an ICN, such as ICN 105. Method 700 may be implemented when the NE receives an Interest packet. At step 710, the NE receives an Interest packet through an interface, wherein the Interest packet comprises an in-packet bloom filter and at least one counting filter associated with an element of the in-packet bloom filter. At step 720, the NE determines an outbound interface to forward the Interest packet to a next hop in the ICN. At step 730, the NE select a local bloom filter based on a mapping of the interface to the local bloom filter. At step 740, the NE updates a value for the in-packet bloom filter based on a product determined by a bitwise OR operation of the local bloom filter and the in-packet bloom filter. At step 750, the NE increments the at least one counting filter based on a change to the associated element of the in-packet bloom filter. At step 760, the NE updates the in-packet bloom filter in the Interest packet. At step 770, the NE updates the at least one counting filter in the Interest packet. At step 780, the NE forwards the Interest packet through the outbound interface.

Figure 8:
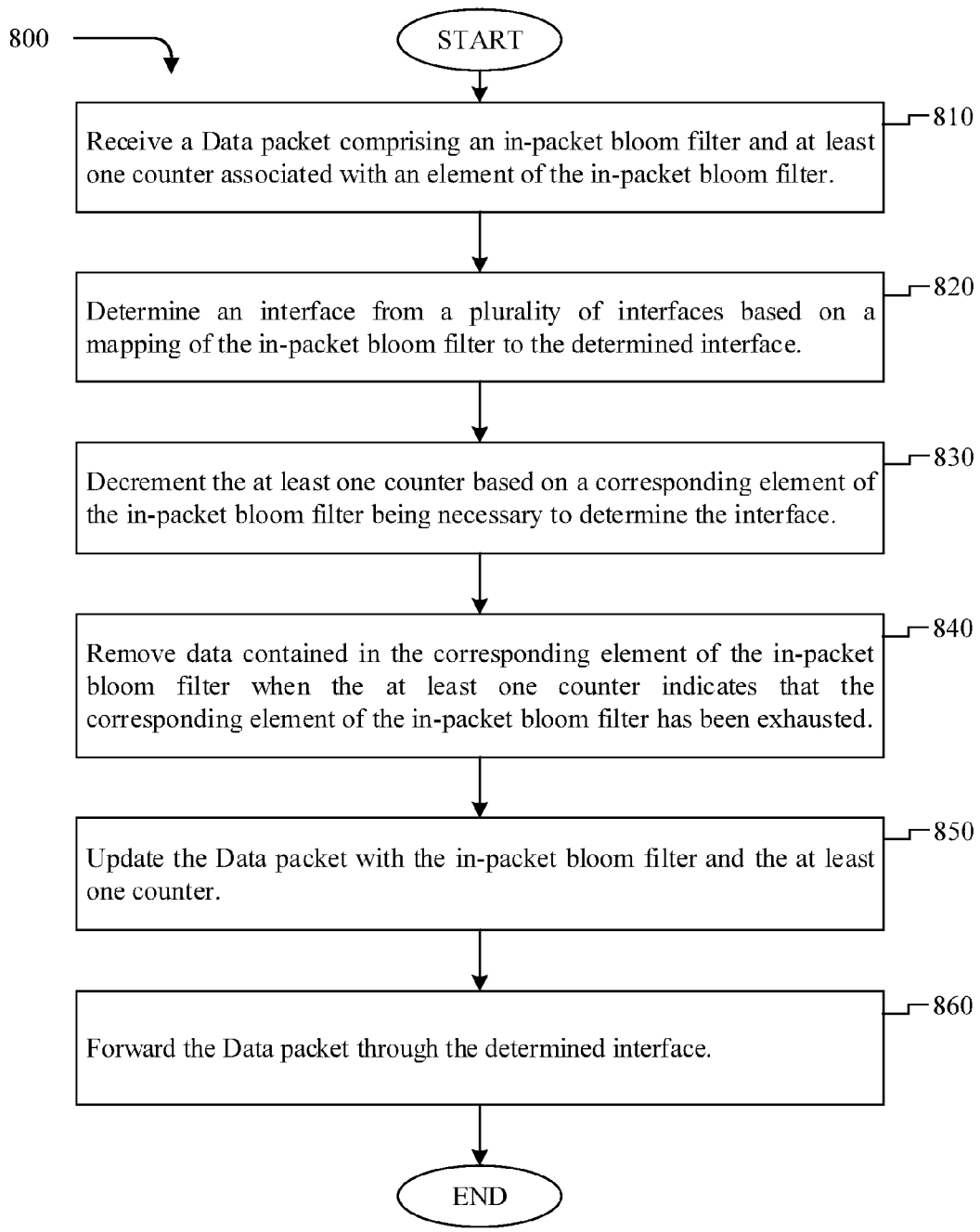
FIG. 8 is a flowchart of an exemplary embodiment of a method of forwarding a Data packet received by an NE in an ICN.

FIG. 8 is a flowchart of an exemplary embodiment of a method 800 of forwarding a Data packet, such as packet 300, received by an NE, such as edge content node 130 and/or core content node 135, in an ICN, such as ICN 105. Method 800 may be implemented when the NE receives a Data packet. At step 810, the NE receives Data packet comprising an in-packet bloom filter and at least one counter associated with an element of the in-packet bloom filter. At step 820, the NE determines an interface from a plurality of interfaces based on a mapping of the in-packet bloom filter to the determined interface. At step 830, the NE decrements the at least one counter based on a corresponding element of the in-packet bloom filter being necessary to determine the interface. At step 840, the NE removes data contained in the corresponding element of the in-packet bloom filter when the at least one counter indicates that the corresponding element of the in-packet bloom filter has been exhausted. At step 850, the NE updates the Data packet with the in-packet bloom filter and the at least one counter. At step 860, the NE forwards the Data packet through the determined interface.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) configured to operate in an information centric network (ICN), the NE comprising:
 a receiver configured to receive an Interest packet through a first interface, wherein the Interest packet comprises an in-packet bloom filter;
 a processor coupled to the receiver, wherein the processor is configured to:
  determine a second interface to forward the Interest packet to a next hop in the ICN;
  select a local bloom filter from a plurality of local bloom filters based on a mapping of the first interface to the selected local bloom filter;
  update the in-packet bloom filter with a combination of the selected local bloom filter and the in-packet bloom filter to generate an updated in-packet bloom filter; and store the updated in-packet bloom filter in the Interest packet; and a transmitter coupled to the processor configured to forward the Interest packet through the second interface, wherein the updated in-packet bloom filter contains reverse path information that identifies a reverse path that a Data packet is to take through the ICN, and wherein the reverse path is opposite a path taken through the ICN by the Interest packet corresponding to the Data packet.

2. The NE of claim 1, wherein the Interest packet further comprises a counter associated with an element of the updated in-packet bloom filter.

3. The NE of claim 2, wherein the processor is further configured to:
increment the counter based on a change to a value of the associated element of the updated in-packet bloom filter; and
store the counter in the Interest packet.

4. The NE of claim 3, wherein the counter is a counting filter.

5. The NE of claim 1, wherein the local bloom filter is selected based on the mapping of the first interface to the selected local bloom filter and the determined second interface.

6. The NE of claim 1, wherein the combination of the local bloom filter and the in-packet bloom filter is determined by a bitwise OR operation.

7. The NE of claim 1, wherein the updated in-packet bloom filter comprises thirty-two bytes.

8. The NE of claim 1, wherein the receiver is further configured to receive the Data packet through a third interface, wherein the Data packet comprises a data packet in-packet bloom filter, wherein the processor is further configured to determine a fourth interface based on a matching of the data packet in-packet bloom filter to at least one of the plurality of local bloom filters, and wherein the transmitter is further configured to forward the Data packet through the fourth interface.

9. The NE of claim 8, wherein the matching is based on a bitwise AND operation to the data packet in-packet bloom filter and each of the local bloom filters.

10. The NE of claim 8, wherein the Data packet further comprises a data packet counter associated with an element of the data packet in-packet bloom filter, and wherein the processor is further configured to:
decrement the data packet counter based on a change to the associated element of the data packet in-packet bloom filter; and
store the data packet counter in the Data packet.

11. A method implemented in a network element (NE) configured to operate in an information centric network (ICN), comprising:
receiving an Interest packet through an interface, wherein the Interest packet comprises an in-packet bloom filter and at least one counting filter associated with an element of the in-packet bloom filter;
determining an outbound interface to forward the Interest packet to a next hop in the ICN;
selecting a local bloom filter based on a mapping of the interface to the local bloom filter;
updating a value for the in-packet bloom filter based on a combination determined by a bitwise OR operation of the local bloom filter and the in-packet bloom filter;
incrementing the at least one counting filter based on a change to the associated element of the in-packet bloom filter;
updating the in-packet bloom filter in the Interest packet with the combination to generate an updated in-packet bloom filter;
updating the at least one counting filter in the Interest packet; and
forwarding the Interest packet through the outbound interface,
wherein the updated in-packet bloom filter contains reverse path information that identifies a reverse path that a Data packet is to take through the ICN, and wherein the reverse path is opposite a path taken through the ICN by the Interest packet corresponding to the Data packet.

12. The method of claim 11, wherein the local bloom filters are based on k hash functions.

13. The method of claim 12, wherein the local bloom filters are pre-calculated for each of the interfaces.

14. The method of claim 13, wherein the local bloom filters are recalculated at an adaptive interval.

15. The method of claim 11, wherein the updated in-packet bloom filter is encoded in a header of the Interest packet.

16. The method of claim 11, wherein the reverse path information is encoded in a header of the Interest packet.

17. The method of claim 11, wherein the NE in the ICN is configured to not record entries in a Pending Interest Table (PIT) regarding received Interest packets.

18. A method implemented in a network element (NE) configured to operate in an information centric network (ICN), comprising:
receiving a Data packet comprising an in-packet bloom filter and at least one counter associated with an element of the in-packet bloom filter;
determining an interface from a plurality of interfaces based on a mapping of the in-packet bloom filter to the determined interface;
decrementing the at least one counter based on a corresponding element of the in-packet bloom filter being necessary to determine the interface;
removing data contained in the corresponding element of the in-packet bloom filter when the at least one counter indicates that the corresponding element of the in-packet bloom filter has been exhausted;
updating the Data packet and the counter with a combination of the selected local bloom filter and the in-packet bloom filter to generate an updated in-packet bloom filter; and
forwarding the Data packet through the determined interface,
wherein the updated in-packet bloom filter contains reverse path information that identifies a reverse path that the Data packet is to take through the ICN, and wherein the reverse path is opposite a path taken through the ICN by an Interest packet corresponding to the Data packet.

19. The method of claim 18, wherein the updated in-packet bloom filter is encoded in a header of the Data packet.

20. The method of claim 18, wherein the updated in-packet bloom filter is copied from another in-packet bloom filter contained within a corresponding Interest packet received by a content producer.

* * * * *